US009852748B1

(12) United States Patent
Sahoo et al.

(10) Patent No.: US 9,852,748 B1
(45) Date of Patent: Dec. 26, 2017

(54) DEVICES INCLUDING A NFT HAVING AT LEAST ONE AMORPHOUS ALLOY LAYER

(71) Applicant: SEAGATE TECHNOLOGY LLC, Cupertino, CA (US)

(72) Inventors: Sarbeswar Sahoo, Shakopee, MN (US); Tong Zhao, Eden Prairie, MN (US); Xiaoyue Huang, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/372,513

(22) Filed: Dec. 8, 2016

Related U.S. Application Data

(60) Provisional application No. 62/264,574, filed on Dec. 8, 2015.

(51) Int. Cl.
*G11B 5/31* (2006.01)
*G11B 5/127* (2006.01)
*G11B 5/00* (2006.01)

(52) U.S. Cl.
CPC ............ *G11B 5/313* (2013.01); *G11B 5/1278* (2013.01); *G11B 2005/0021* (2013.01)

(58) Field of Classification Search
CPC .................. G11B 5/313; G11B 5/1278; G11B 2005/0021
See application file for complete search history.

(56) References Cited

U.S. PATENT DOCUMENTS

| 4,492,873 | A | 1/1985 | Dmitriev |
| 5,482,611 | A | 1/1996 | Helmer |
| 5,849,093 | A | 12/1998 | Andra |
| 5,945,681 | A | 8/1999 | Tokiguchi |
| 6,130,436 | A | 10/2000 | Renau |
| 6,144,098 | A | 11/2000 | Iyer |
| 6,589,676 | B1 | 7/2003 | Gui |
| 6,632,483 | B1 | 10/2003 | Callegari |
| 6,641,932 | B1 | 11/2003 | Xu |
| 6,683,426 | B1 | 1/2004 | Kleeven |
| 6,909,103 | B2 | 6/2005 | Platzgummer |
| 7,018,729 | B2 | 3/2006 | Pocker |
| 7,377,228 | B2 | 5/2008 | Mack |

(Continued)

FOREIGN PATENT DOCUMENTS

| EP | 0240088 | 10/1987 |
| EP | 0580368 | 1/1994 |

(Continued)

OTHER PUBLICATIONS

Al-Bayati et al., Junction Profiles of Sub keV Ion Implantation for Deep Sub-Quarter Micron Devices, *IEEE*, 2000, pp. 87-90.

(Continued)

*Primary Examiner* — Brian Miller
(74) *Attorney, Agent, or Firm* — Mueting, Raasch & Gebhardt, P.A.

(57) ABSTRACT

Disclosed are devices that include a near field transducer (NFT), the NFT having a peg and a disc and the peg including peg material and at least one associated amorphous blocker layer, wherein the amorphous blocker layer includes an amorphous metal alloy and the amorphous blocker layer is within the peg material, on one or more surfaces of the peg material, or both.

20 Claims, 6 Drawing Sheets

(56) References Cited

U.S. PATENT DOCUMENTS

| | | | |
|---|---|---|---|
| 7,476,855 B2 | 1/2009 | Huang | |
| 7,544,958 B2 | 6/2009 | Low | |
| 7,609,003 B2 | 10/2009 | Horsky | |
| 7,965,464 B2* | 6/2011 | Batra | G11B 5/1278 360/125.74 |
| 7,998,607 B2 | 8/2011 | Ikeda | |
| 8,031,561 B2 | 10/2011 | Hellwig | |
| 8,040,761 B2 | 10/2011 | Kawamori | |
| 8,248,891 B2 | 8/2012 | Lee | |
| 8,339,740 B2* | 12/2012 | Zou | G11B 5/3133 360/125.31 |
| 8,351,151 B2 | 1/2013 | Katine | |
| 8,391,108 B2 | 3/2013 | Peng | |
| 8,400,902 B2 | 3/2013 | Huang | |
| 8,405,056 B2 | 3/2013 | Amaldi | |
| 8,411,393 B2 | 4/2013 | Zou | |
| 8,427,925 B2* | 4/2013 | Zhao | B82Y 10/00 360/59 |
| 8,514,673 B1* | 8/2013 | Zhao | G11B 5/3133 369/13.33 |
| 8,830,800 B1* | 9/2014 | Pitcher | G11B 5/3106 369/13.33 |
| 8,867,322 B1* | 10/2014 | Chernyshov | G11B 5/7325 360/131 |
| 8,913,468 B1 | 12/2014 | Peng | |
| 8,934,198 B2* | 1/2015 | Zou | G11B 33/144 360/125.31 |
| 8,971,161 B2* | 3/2015 | Cheng | G11B 5/6088 369/13.33 |
| 8,976,634 B2* | 3/2015 | Cheng | G11B 5/3106 369/13.13 |
| 9,099,117 B2* | 8/2015 | Wessel | G02B 6/1226 |
| 9,218,829 B2 | 12/2015 | Cheng | |
| 9,224,416 B2* | 12/2015 | Zhao | G11B 13/04 |
| 9,245,573 B2* | 1/2016 | Sahoo | G11B 5/314 |
| 9,251,830 B1* | 2/2016 | Duda | G11B 13/08 |
| 9,263,074 B2 | 2/2016 | Huang | |
| 9,281,002 B2* | 3/2016 | Brons | G11B 5/314 |
| 2005/0012052 A1 | 1/2005 | Platzgummer | |
| 2006/0238133 A1 | 10/2006 | Horsky | |
| 2008/0230724 A1 | 9/2008 | Low | |
| 2010/0123965 A1 | 5/2010 | Lee | |
| 2010/0123967 A1 | 5/2010 | Batra | |
| 2010/0190036 A1 | 7/2010 | Komvopoulos | |
| 2010/0320403 A1 | 12/2010 | Amaldi | |
| 2010/0329085 A1 | 12/2010 | Kawamori | |
| 2011/0006214 A1 | 1/2011 | Bonig | |
| 2011/0026161 A1 | 2/2011 | Ikeda | |
| 2011/0096431 A1 | 4/2011 | Hellwig | |
| 2011/0205863 A1 | 8/2011 | Zhao | |
| 2012/0045662 A1 | 2/2012 | Zou | |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0288077 A1 | 10/2013 | Dhawam | |
| 2014/0004384 A1* | 1/2014 | Zhao | G11B 5/314 428/813 |
| 2014/0113160 A1 | 4/2014 | Pitcher | |
| 2014/0307534 A1 | 10/2014 | Zhou | |
| 2014/0376352 A1 | 12/2014 | Cheng | |
| 2015/0340052 A1* | 11/2015 | Sankar | G11B 5/6088 369/13.33 |
| 2016/0133277 A1* | 5/2016 | Cheng | C23C 8/02 369/13.33 |
| 2016/0133280 A1* | 5/2016 | Cheng | G11B 5/3106 369/13.33 |
| 2016/0133288 A1* | 5/2016 | Zhao | G11B 5/314 369/13.33 |
| 2016/0275972 A1* | 9/2016 | Zhao | G11B 5/314 |
| 2016/0275979 A1* | 9/2016 | Sahoo | G11B 5/314 |
| 2016/0284365 A1* | 9/2016 | Brons | G11B 5/314 |
| 2016/0351211 A1* | 12/2016 | Blaber | G11B 5/314 |
| 2016/0351221 A1* | 12/2016 | Blaber | G11B 5/6088 |
| 2016/0351222 A1* | 12/2016 | Blaber | G11B 5/3133 |

FOREIGN PATENT DOCUMENTS

| | | |
|---|---|---|
| EP | 0942072 | 9/1999 |
| EP | 1328027 | 7/2003 |
| EP | 2106678 | 10/2008 |
| WO | WO 97/45834 | 12/1997 |
| WO | WO 2013/163195 | 10/2013 |
| WO | WO 2013/163470 | 10/2013 |

OTHER PUBLICATIONS

Angel et al., "Enhanced Low Energy Drift-Mode Beam Currents in a High Current Ion Implanter," *IEEE*, 1999, pp. 219-222.

Druz et al., "Diamond-Like Carbon Films Deposited Using a Broad, Uniform Ion Beam from an RF Inductively Coupled CH4-Plasma Source", Diamond and Related Materials, vol. 7, No. 7, Jul. 1998, pp. 965-972.

Liu et al., "Influence of the Incident Angle of Energetic Carbon Ions on the Properties of Tetrahedral Amorphous Carbon (ta—C) films", *Journal of Vacuum Science and Technology*, vol. 21, No. 5, Jul. 25, 2003, pp. 1665-1670.

Metallization: "Metallization"; chapter 5, In: *Kris v. Srikrishnan and Geraldine C. Schwartz*:"Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

Piazza et al., "Large Area Deposition of Hydrogenated Amorphous Carbon Films for Optical Storage Disks", Diamond and Related Materials, vol. 13, No. 4-8, Apr. 2004, pp. 1505-1510.

Robertson, J., "Diamond-Like Amorphous Carbon," *Materials Science and Engineering R 37*, 2002, pp. 129-281.

Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

\* cited by examiner

DEVICES INCLUDING A NFT HAVING AT LEAST ONE AMORPHOUS ALLOY LAYER

PRIORITY

This application claims priority to U.S. Provisional Application No. 62/264,574 filed on Dec. 8, 2015, the disclosure of which is incorporated herein by reference thereto

SUMMARY

Disclosed are devices that include a near field transducer (NFT), the NFT having a peg and a disc and the peg including peg material and at least one associated amorphous blocker layer, wherein the amorphous blocker layer includes an amorphous metal alloy and the amorphous blocker layer is within the peg material, on one or more surfaces of the peg material, or both.

Also disclosed are devices that include such NFTs and additional components such as energy sources and waveguides, for example.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (referred to through as HAMR) utilizes radiation, for example from a laser, to heat media to a temperature above its curie temperature, enabling magnetic recording. In order to deliver the radiation, e.g., a laser beam, to a small area (on the order of 20 to 50 nm for example) of the medium, a NFT is utilized. During a magnetic recording operation, the NFT absorbs energy from a laser and focuses it to a very small area; this can cause the temperature of the NFT to increase. The temperature of the NFT can be elevated up to about 400° C. or more.

In some embodiments, a NFT can include a small peg and a large disk. Current materials have been shown to exhibit many grain boundaries that arise from deposition and annealing processes. Such grain boundaries can act as pathways for diffusion of any seed material, dopant materials, plasmonic materials, adjacent structure materials, ambient atmospheric materials, or any combinations thereof. Diffusion of various materials along these grain boundaries can contribute to failure of the NFT and heads containing the NFTs.

Figure 1:
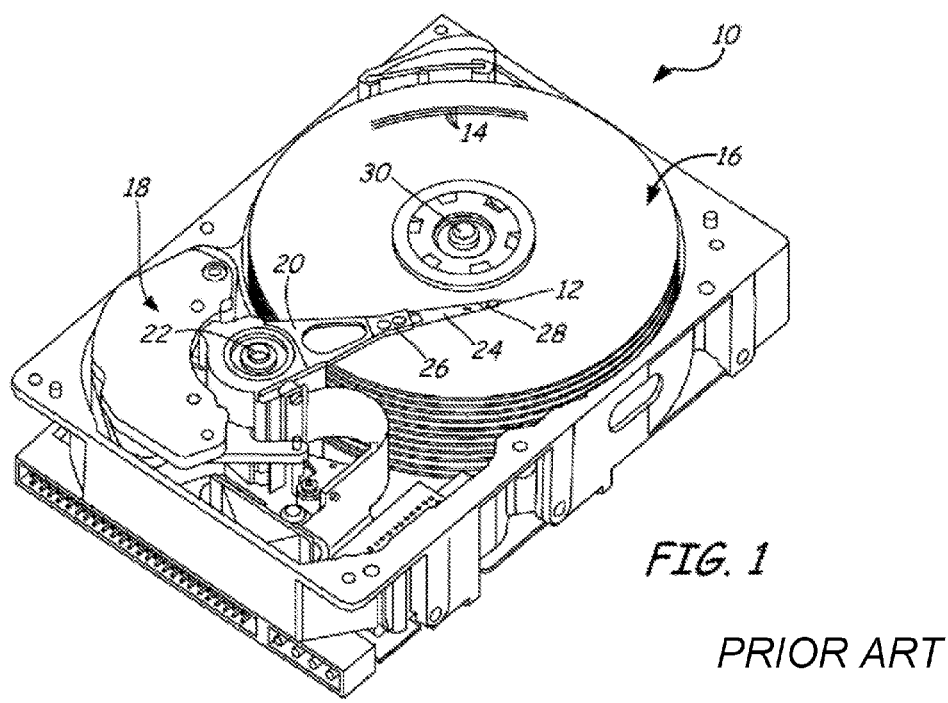
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
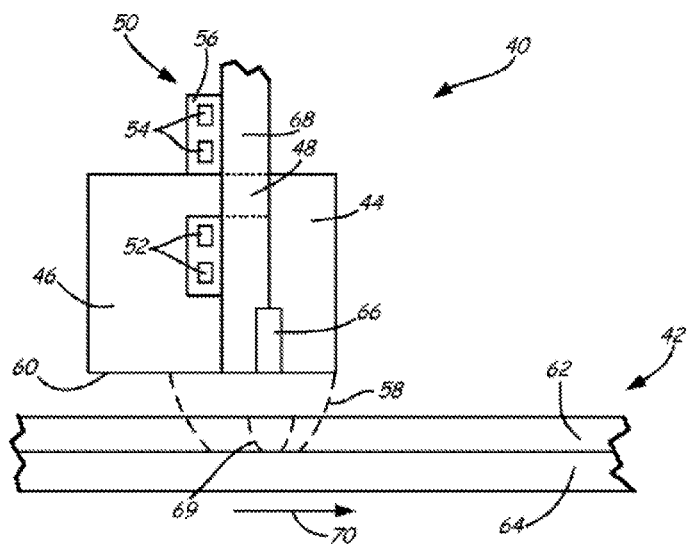
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Devices disclosed herein can also include other structures. Devices disclosed herein can be incorporated into larger devices. For example, sliders can include devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example. It should also be noted that disclosed devices can be utilized in systems other than disc drives such as that depicted in FIG. 1.

Disclosed devices include one or more layers of amorphous alloy materials configured to stop the diffusion away from, into or through the NFT. Amorphous alloy blocker layers, as they are referred to herein, can be utilized at various different locations in the NFT, adjacent or around the NFT structure, or combinations thereof.

The remaining portions of the NFT, or more specifically the peg, can generally be made of a plasmonic material or can be substantially made of a plasmonic material. Illustrative NFT materials can include plasmonic materials including, for example gold (Au), silver (Ag), aluminum (Al), copper (Cu), ruthenium (Ru), rhodium (Rh), iridium (Ir), or alloys thereof; thermally conductive oxides, and indium tin oxide (ITO). In some embodiments, illustrative NFT materials can also include those disclosed in U.S. Pat. No. 9,251,837, U.S. Pat. No. 8,427,925, and U.S. Pat. No. 8,830,800, and U.S. Pat. No. 8,934,198, the disclosures of which are incorporated herein by reference thereto. In some embodiments, an intermixing layer can include gold as a first material.

In some embodiments, amorphous alloy materials can be co-deposited by co-sputtering or co-evaporation from one or more than one targets. In other embodiments, amorphous alloy materials can be prepared by atomic layer deposition (ALD) by using multiple precursors of metals or by pulsed laser deposition, for example. An amorphous material is one that is not crystalline in nature and does not have a long range ordered lattice structure. In some embodiments, an amorphous material can be described as having a smaller grain size than that of a crystalline layer. In some embodiments, an amorphous material is one in which the average grain size is not greater than 5 nm, or in some embodiments not greater than 3 nm. In some embodiments, the average grain size of a material could be measured using high resolution transmission electron microscopy (TEM), for example.

Figure 3A:
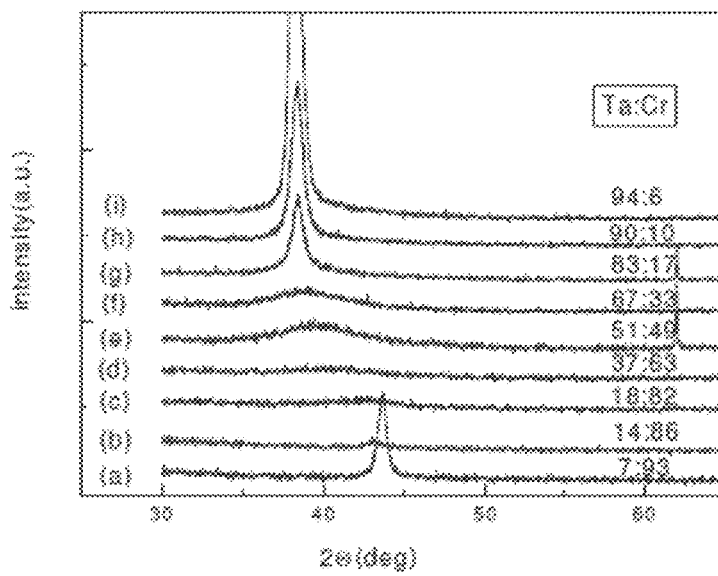
FIGS. 3A and 3B are X-ray diffraction patterns of Ta—Cr thin films having various compositions (FIG. 3A) and transmission electron microscope (TEM) diffraction patterns for Ta—Cr (49%).
Figure 3B:
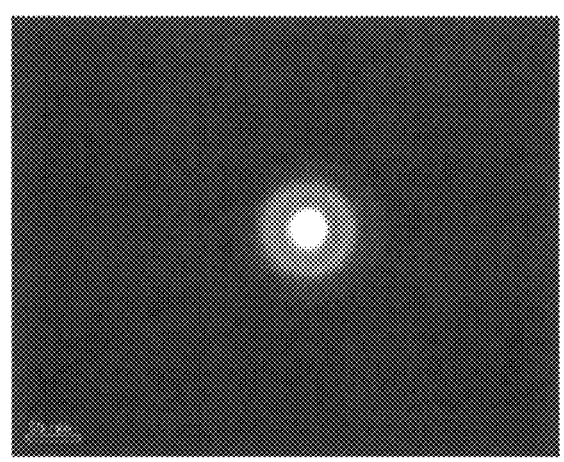

In some embodiments, amorphous alloy materials can include two (or more) elements having a relatively large difference (e.g., greater than or equal to 10%) in atomic radii, a relatively large (e.g., at least 5 KJ/mole (or more specifically at least 7 KJ/mole, which is typically a negative heat of mixing, exothermic) heat of mixing, or combinations thereof. Such alloys may show an amorphous nature over relatively large concentration gradients. Illustrative examples of alloys that can be used in amorphous alloy blocker layers can include, for example Ta—Cr, Zr—Cr, Nb—Cr, Ni—Zr, Nb—Pd, Nb—Sb, Nb—Ir, Nb—Pt, Nb—Au, Zr—Pt, Zr—Ir, Zr—Au, Rh—Tb, Rh—Ta, Ta—Cr—N, Zr—Cr—N, Nb—Cr—N, or combinations thereof. In some embodiments, examples of alloys that can be used in amorphous alloy blocker layers can include, for example Ta—Cr, Zr—Cr, Nb—Cr, Ni—Zr, or combinations thereof. Further information regarding materials can be found in Materials Transactions, vol. 46, No. 12 (2005) pp. 2817 to 2829), the disclosure of which is incorporated herein by reference thereto. FIGS. 3A and 3B provide specific examples of X-ray diffraction (XRD) patterns of Ta—Cr thin films having various compositions (FIG. 3A) and a transmission electron microscope (TEM) diffraction pattern of a Ta—Cr (49%) alloy. Both such methods can be utilized to determine if a particular alloy or alloy layer is amorphous in nature.

Figure 4A:
FIGS. 4A, 4B, 4C, 4D, 4E and 4F are cross sections of portions of NFT devices including disclosed amorphous blocker layers.

In some embodiments, an amorphous alloy blocker layer can be used within the material of the NFT. In some embodiments, an amorphous alloy blocker layer can be used at least within the peg of a NFT that includes a peg and disc. FIG. 4A illustrates such an embodiment. The device includes peg material 410 and an amorphous blocker layer 405 within the peg material. An amorphous blocker layer that is positioned within the peg material can be referred to as an interlayer amorphous blocker layer. An amorphous blocker layer 405 such as that depicted in FIG. 4A can prevent or minimize diffusion of seed layer material from a seed layer (not pictured in FIG. 4A) that can optionally be positioned beneath the peg material 410 in FIG. 4A. The positioning of this type of amorphous blocker layer and the thickness thereof can be chosen such that superior mechanical strength, structural properties, or both may be obtained without compromising or without substantially compromising the optical properties of the peg material. In some embodiments, amorphous blocker layers that are within the peg material can have thicknesses of not less than 5 Å, or not less than 10 Å for example. In some embodiments, amorphous blocker layers that are within the peg material can have thicknesses of not greater than 20 Å, or not less than 15 Å for example. In some embodiments, an amorphous blocker layer that is within the peg can be substantially located at the middle of the thickness of the peg. Such a particular embodiment could function to both limit diffusion of atoms from the top to the bottom and diffusion of atoms from the bottom to the top. Any amorphous alloy material or materials could be utilized for such amorphous blocker layers. In some embodiments, Ta—Cr, Zr—Cr, Nb—Cr, Ni—Zr, or combinations thereof can be utilized as such amorphous blocker layers. Such specific amorphous blocker layers could be useful in embodiments where an optional seed layer includes Zr.

Figure 4B:
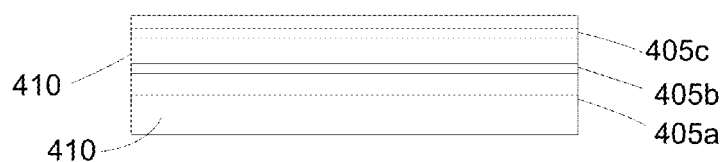

It should also be noted that more than one interlayer amorphous blocker layer could be present in a single peg (or other NFT portion). An illustrative embodiment of such a device can be seen in FIG. 4B. This device includes peg material 410 and three interlayer amorphous blocker layers 405a, 405b, and 405c. Properties of the three interlayer amorphous blocker layers can have properties such as those described above. The number of interlayer amorphous blocker layers in such an embodiment, the independent thickness of each interlayer amorphous blocker layer, the independent positioning of each interlayer amorphous blocker layer, the material of each interlayer amorphous blocker layer, or combinations thereof can all be chosen such that thermo-mechanical properties are maximized without compromising or without substantially compromising the optical properties of the peg material. In some embodiments, such a multiple interlayer amorphous blocker layer device can include the gold (Au), a gold alloy (e.g., AuX), rhodium (Rh), or a rhodium alloy (e.g., RhX) in combination with the multiple interlayer amorphous blocker layers. In some more specific embodiments, the multiple interlayer amorphous blocker layers could include amorphous Ta—Cr, Zr—Cr, Nb—Cr, Ni—Zr or combinations thereof.

Figure 4C:

In some embodiments, an amorphous alloy blocker layer can be used on an upper surface of the peg material. Such an embodiment is depicted in FIG. 4C. The device includes peg material 410 and an amorphous blocker layer 407 on the upper surface of the peg material 410. An amorphous blocker layer that is positioned on an upper surface of the peg material can be referred to as a cap amorphous blocker layer. An amorphous blocker layer 407 such as that depicted in FIG. 4C may prevent or minimize the loss of dopants that may be present in the peg material, for example stop them from diffusing out of the peg material into a structure that may be overlying the peg material 410. The thickness of this type of amorphous blocker layer can be chosen such that superior mechanical strength, structural properties, or both may be obtained without compromising or without substantially compromising the optical properties of the peg material. In some embodiments, amorphous blocker layers that are positioned on an upper surface of the peg material can have thicknesses of not less than 5 Å, or not less than 10 Å for example. In some embodiments, amorphous blocker layers that are positioned on an upper surface of the peg material can have thicknesses of not greater than 20 Å, or not less than 15 Å for example. Any amorphous alloy material or materials could be utilized for such amorphous blocker layers. In some embodiments, Ta—Cr, Zr—Cr, Nb—Cr, Ni—Zr, or combinations thereof can be utilized as such amorphous blocker layers.

Figure 4D:
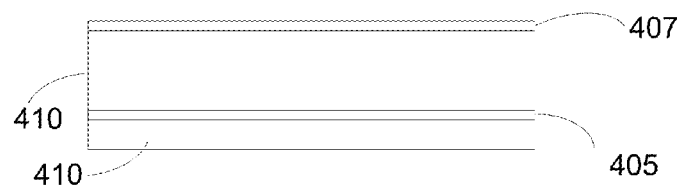

FIG. 4D shows an example of an embodiment that includes both an interlayer amorphous blocker layer 405 within the peg material 410 and a cap layer amorphous blocker layer 407 on an upper surface of the peg material. It should also be noted that it is also contemplated herein to include more than one interlayer amorphous blocker layer within the peg material. Both the interlayer amorphous blocker layer and the cap amorphous blocker layer can have properties such as those described above. It should also be noted that the multiple interlayer amorphous blocker layers of FIG. 4B could also be utilized in combination with a cap amorphous blocker layer as shown in FIG. 4C.

Figure 4E:
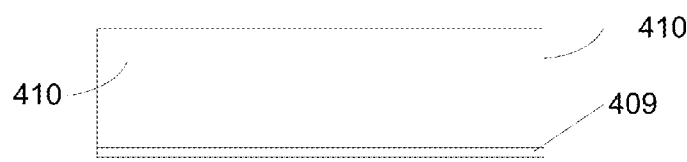

FIG. 4E shows another possible use or placement of an amorphous blocker layer. This particular device includes peg material 410 and an amorphous blocker layer 409 on a lower surface of the peg material. The amorphous blocker layer 409 in such an embodiment can be deposited first and then the peg material 410 can be grown thereon, so that the amorphous blocker layer 409 functions as a seed amorphous blocker layer. In some embodiments, the seed amorphous blocker layer could be continuous and would also not diffuse through grain boundaries in the peg. The thickness of a seed amorphous blocker layer can be chosen such that superior mechanical strength, structural properties, specific growth of peg materials, or combinations thereof may be obtained without compromising or without substantially compromising the optical properties of the peg material. In some embodiments, seed amorphous blocker layers can have thicknesses of not less than 5 Å, or not less than 10 Å for example. In some embodiments, seed amorphous blocker layers can have thicknesses of not greater than 20 Å, or not less than 15 Å for example. Any amorphous alloy material or materials could be utilized for such seed amorphous blocker layers. In some embodiments, Ta—Cr, Zr—Cr, Nb—Cr, Ni—Zr, or combinations thereof can be utilized as seed amorphous blocker layers. Such materials could be particularly useful in embodiments where the peg material to be grown thereon is gold (Au) or a gold alloy (AuX). In some specific embodiments where the peg material is rhodium (Rh), or a rhodium alloy (RhX), the seed amorphous blocker layer could include, for example Y—Pd, Y—Ir, Y—Pt, Y—Au, Y—Ti, Ta—N, Ta—Co, Ta—Cu, Ta—Ge, Ta—Ru, or combinations thereof.

Figure 4F:
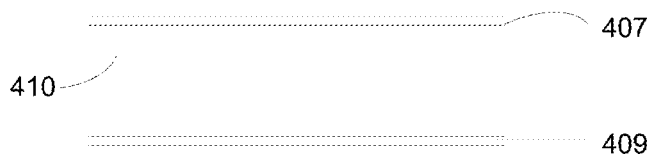

FIG. 4F shows an example of an embodiment that includes both a seed amorphous blocker layer 409 adjacent or under a lower surface of the peg material 410 and a cap layer amorphous blocker layer 407 adjacent or on an upper surface of the peg material. It should also be noted that it is also contemplated herein to include one or more than one interlayer amorphous blocker layer within the peg material when both a cap and seed amorphous blocker layer are used. Both the seed amorphous blocker layer and the cap amorphous blocker layer (as well as the optional interlayer amorphous blocker layers) can have properties such as those described above.

In some embodiments, amorphous blocker layers can be utilized on or adjacent to one or more surfaces (more than simply as a seed, cap or both as depicted in FIGS. 4A to 4F) of one or more portions of a NFT. In some embodiments, one or more than one surfaces of a peg (which is part of a peg and disc NFT for example) can have an amorphous alloy layer thereon.

Figure 5A:
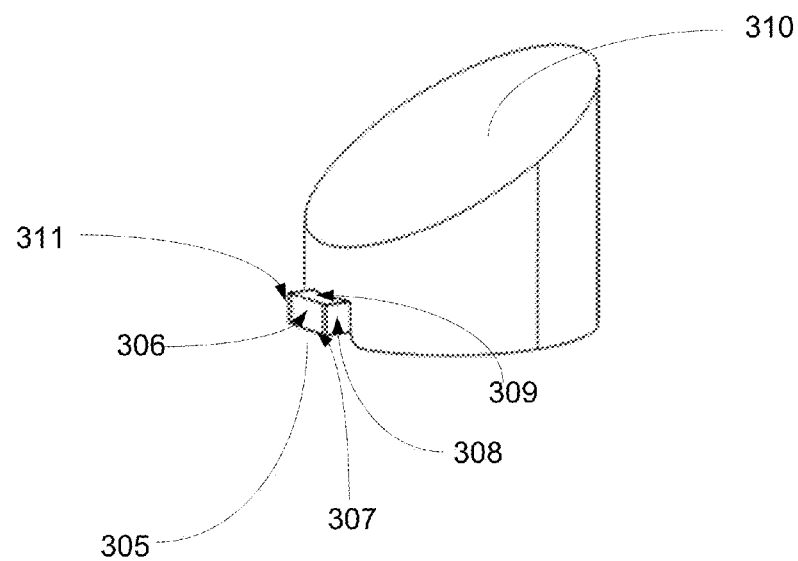
FIG. 5A shows a perspective view of an example of a peg and a disc of a peg and disc type NFT.
Figure 5B:
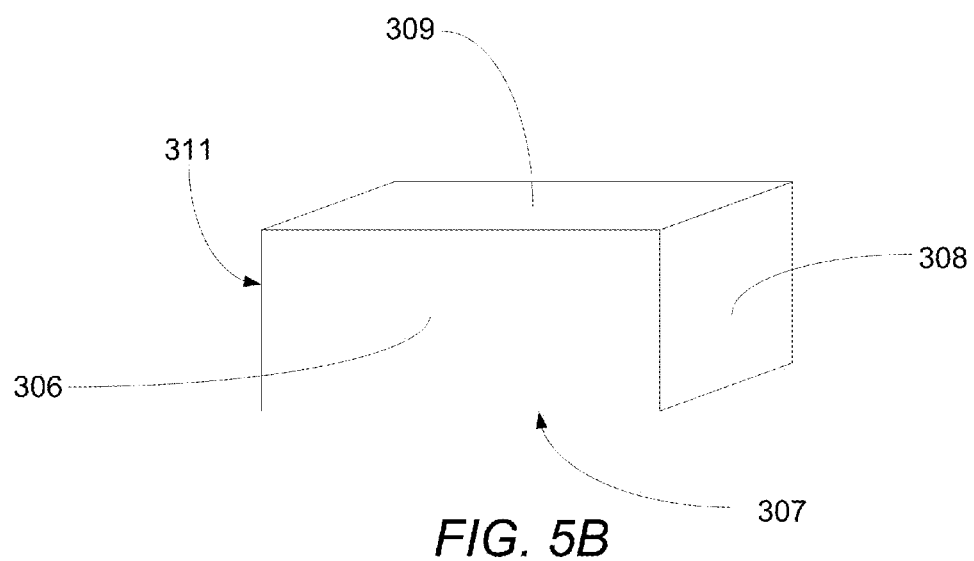
FIG. 5B shows a closer view of only the peg of the peg and disc type NFT shown in FIG. 5A.

FIG. 5A shows a perspective view of an example of a peg and a disc of a peg and disc type NFT, and FIG. 5B shows a closer view of only the peg of the peg and disc type NFT shown in FIG. 5A. The NFT in FIG. 3A includes a peg 305 and a disc 310. The peg 305 shown in FIGS. 5A and 5B includes five surfaces that are not in contact with the disc 310, an air bearing surface 306, a first surface 307, a second surface 309, a third surface 308, and a fourth surface 311.

In some embodiments, when the NFT is in a larger device, the second surface 309 and the first surface 307 are facing the write pole and core of the waveguide respectively. In some embodiments, when the NFT is in a larger device, the third surface 308 and the fourth surface 311 are not facing the write pole or the core of the waveguide. More specifically, the third surface 308 would be located in front of the paper on which FIG. 2 is depicted and the fourth surface 311 would be located behind the paper on which FIG. 2 is depicted. In some embodiments, the second surface 309 can also be referred to as the NFT-pole surface which faces a NFT-pole space, which can be referred to as a NPS (not shown herein). In some embodiments, the first surface 307 can also be referred to as the NFT-core surface, which faces a NFT-core space, which can be referred to as CNS (not shown herein). In some embodiments, the third surface 308 can also be described as the surface which faces the left side of a device, in some embodiments; a left solid immersion mirror can be located there. In some embodiments, the fourth surface 311 can also be described as the surface which faces the right side of a device, in some embodiments; a right solid immersion mirror can be located there.

Disclosed devices can include one or more amorphous blocker layers located on one or more surfaces of a NFT. In some embodiments, disclosed devices can include one or more amorphous blocker layers located on one or more surfaces of a peg of a NFT. In some embodiments, disclosed devices can include amorphous blocker layers located on two or more surfaces of a peg of a NFT. In some embodiments, disclosed devices can include amorphous blocker layers located on three or more surfaces of a peg of a NFT. In some embodiments, disclosed devices can include amorphous blocker layers located on four or more surfaces of a peg of a NFT. In some embodiments, disclosed devices can include amorphous blocker layers located on all five surfaces of a peg of a NFT. In some embodiments disclosed devices can include amorphous blocker layers located on each of the first surface 307, the second surface 309, the third surface 308, and the fourth surface 311.

Figure 6A:
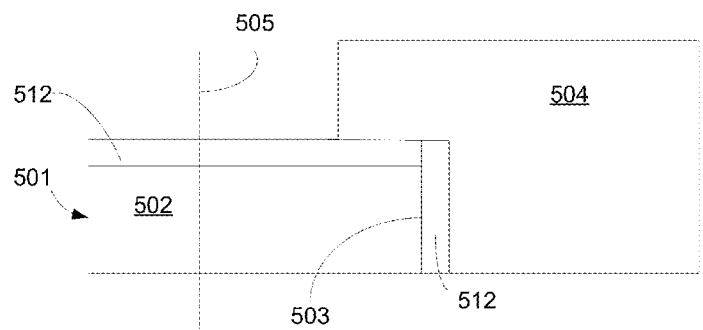
FIG. 6A shows a perspective view of an example of a peg and a disc of a peg and disc type NFT.

FIG. 6A shows a cross sectional view of a peg and disc type NFT taken perpendicular to the air bearing surface ABS 501 of the peg. The NFT includes the peg 502 and the disc

Figure 6B:
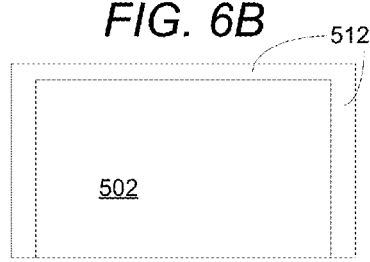
FIG. 6B shows a cross section along line 505 of FIG. 6A.

504. This particular embodiment includes an amorphous blocker layer that is adjacent to or on four surfaces of the peg 502. With FIGS. 3A and 3B in mind, the amorphous blocker layers in the embodiment of FIG. 6A would be located on the second surface (309 in FIGS. 3A and 3B), the third surface (308 in FIGS. 3A and 3B), and the fourth surface (311 in FIGS. 3A and 3B). Additionally, this particular embodiment includes an amorphous blocker layer on a back surface 503 of the peg. The back surface 503 of the peg can be defined by the processing of the peg and the disc, in that the peg and the disc can be made in separate steps. FIG. 6B shows a cross section of the peg 502 taken along line 505 of FIG. 6A. From this view, it can be seen that the amorphous blocker layer is also on the sides of the peg. It should be noted that the various amorphous blocker layers depicted in FIGS. 6A and 6B can be formed in one or more than one steps; can be continuous, discontinuous or a combination thereof; may be the same material or both; may have been differently processed and deposited or processed and deposited the same; may have different thicknesses or the same thicknesses; or any combinations thereof. It should also be noted that the amorphous blocker layer or layers depicted in FIGS. 6A and 6B can be described as embodiments of cap amorphous blocker layers and as such may have properties, advantages, or both such as those described above, for example. Additionally, such amorphous blocker layers could improve adhesion between the peg and adjacent structures or materials, which may contribute to better reliability of the NFT structure.

Figure 6D:
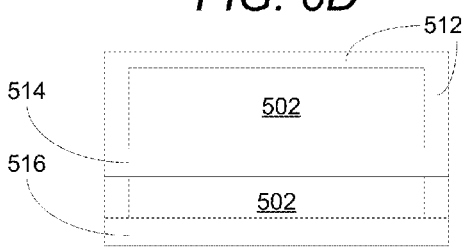
FIG. 6D shows a cross section along line 511 of FIG. 6C.
Figure 6C:
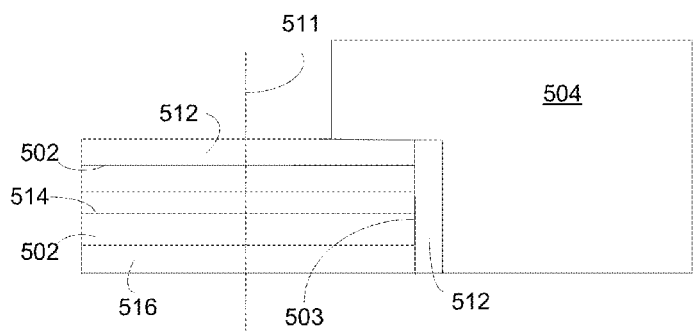
FIG. 6C shows a perspective view of an example of a peg and a disc of a peg and disc type NFT.

FIG. 6C shows a cross sectional view of a peg and disc type NFT taken perpendicular to the air bearing surface of the peg. The NFT in this particular embodiment includes amorphous blocker layer or layers 512 similar to those discussed above with respect to FIGS. 6A and 6B on the second surface (309 in FIGS. 3A and 3B), the third surface (308 in FIGS. 3A and 3B), the fourth surface (311 in FIGS. 3A and 3B) and the back surface 503. This specific embodiment also includes an amorphous blocker layer 516 on the bottom of the peg, e.g., a seed amorphous blocker layer and an interlayer amorphous blocker layer 514. The amorphous blocker layer 516 may be considered as a seed amorphous blocker layer and as such can have properties, advantages, or combinations thereof such as those discussed above. The interlayer amorphous blocker layer 516 may be considered as an interlayer amorphous blocker layer and as such can have properties, advantages, or combinations thereof such as those discussed above. FIG. 6D shows a cross section of the peg 502 taken along line 511 of FIG. 6C. From this view, it can be seen that the amorphous blocker layer is also on the sides of the peg. Additionally, more than one interlayer amorphous blocker layer could be included within the peg material of the peg. It should be noted that the various amorphous blocker layers depicted in FIGS. 6C and 6D can be formed in one or more than one steps; can be continuous, discontinuous or a combination thereof; may be the same material or both; may have been differently processed and deposited or processed and deposited the same; may have different thicknesses or the same thicknesses; or any combinations thereof.

Figure 7:
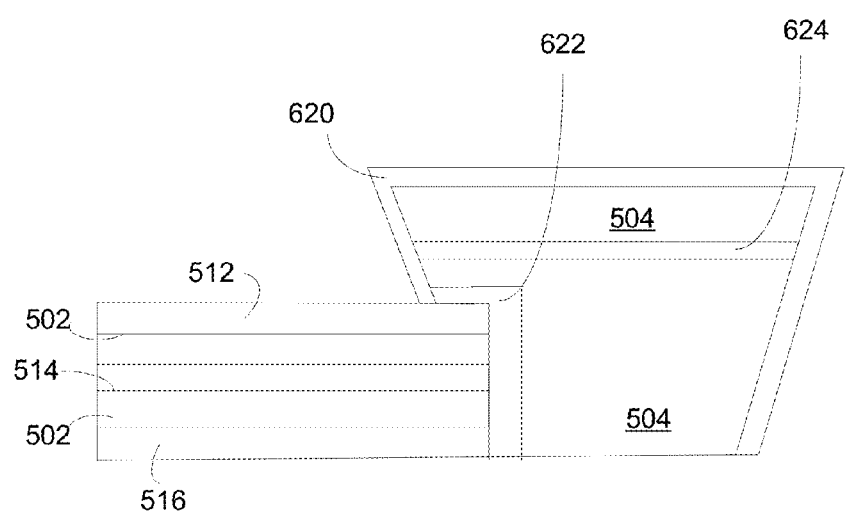
FIG. 7 shows a perspective view of an example of a peg and a disc of a peg and disc type NFT.

Amorphous blocker layers such as those disclosed herein could also optionally be utilized in portions of the NFT other than the peg. For example, they could be utilized in the disc portion of the NFT, the heat sink portion of the NFT, or combinations thereof (it should be noted that in some embodiments, the disc and heat sink are considered to be the same structure and as such the disc will be referred to as a disc/heatsink hereafter). FIG. 7 illustrates various ways in which amorphous blocker layers could be utilized in conjunction with the disc/heatsink. The device of FIG. 7 includes some of the same features as FIGS. 6A to 6D, and such features will not be discussed again. The device in FIG. 7 additionally includes an interlayer amorphous blocker layer 624 within the disc/heatsink material 504. The device also includes amorphous blocker layers 620 surrounding the surfaces of the disc/heatsink material 504. The amorphous blocker layers 620 could have properties like, function like, or both cap amorphous blocker layers discussed above Additionally, the illustrated device includes an amorphous blocker layer between the back of the peg (or the back of the rod depending on fabrication processes and nomenclature) and the disc/heatsink.

In another example, not specifically depicted herein, an amorphous blocker layer can be disposed on one or more than one surface of the entire rod, for example. The rod can generally be described as the back portion of the peg (in a direction directed away from the ABS of the peg). Alternatively, the rod can be described by the process by which it is formed in that the peg is part of the rod, and the peg is described as the front portion (towards the ABS) only of the rod. In some embodiments, the rod can be the peg.

In some embodiments, amorphous blocker layers can have thicknesses of not less than 5 Å, or not less than 10 Å for example. In some embodiments, amorphous blocker layers can have thicknesses of not greater than 20 Å, or not less than 15 Å for example. The thickness (e.g., the average thickness) of an amorphous blocker layer can be measured using, for example, transmission electron microscopy (TEM), X-ray reflectivity (XRR), or x-ray photoelectron spectroscopy (XPS). The thickness can be determined using calibration from standard samples having known thicknesses, for example.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of devices including a near field transducer (NFT) having at least one amorphous alloy layer are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
a near field transducer (NFT), the NFT comprising a peg and a disc and the peg comprising peg material and at least one associated amorphous blocker layer, wherein the amorphous blocker layer comprises an amorphous metal alloy and the amorphous blocker layer is within the peg material, on one or more surfaces of the peg material, or both.

2. The device according to claim 1, wherein the at least one amorphous blocker layer comprises an alloy of Ta—Cr, Zr—Cr, Nb—Cr, Ni—Zr, Nb—Pd, Nb—Sb, Nb—Ir, Nb—Pt, Nb—Au, Zr—Pt, Zr—Ir, Zr—Au, Rh—Tb, Rh—Ta, Ta—Cr—N, Zr—Cr—N, Nb—Cr—N, or combinations thereof.

3. The device according to claim 1, wherein the at least one amorphous blocker layer has a thickness from about 5 Å to about 20 Å.

4. The device according to claim 1, wherein the at least one amorphous blocker layer has a thickness from about 5 Å to about 15 Å.

5. The device according to claim 1, wherein the at least one amorphous blocker layer is within the peg material.

6. The device according to claim 1, wherein the NFT comprises more than one amorphous blocker layers within the peg material.

7. The device according to claim 1, wherein the NFT comprises an amorphous blocker layer on one or more surfaces of the peg material.

8. The device according to claim 1, wherein the NFT comprises an amorphous blocker layer underneath the peg.

9. The device according to claim 1, wherein the NFT comprises an amorphous blocker layer on an upper surface of the peg.

10. The device according to claim 1, wherein the NFT comprises an amorphous blocker layer on one or both side surfaces of the peg.

11. The device according to claim 1, wherein the NFT comprises an amorphous blocker layer on a back surface of the peg.

12. The device according to claim 1, wherein the NFT comprises an additional amorphous blocker layer associated with the disc of the NFT.

13. The device according to claim 12, wherein the additional amorphous blocker layer associated with the disc of the NFT is within the disc material.

14. The device according to claim 12, wherein the additional amorphous blocker layer associated with the disc of the NFT is on a surface of the disc.

15. The device according to claim 12, wherein the additional amorphous blocker layer is on a top surface of the disc.

16. The device according to claim 12, wherein the additional amorphous blocker layer is on one or more side surfaces of the disc.

17. The device according to claim 1, wherein the NFT comprises gold (Au), silver (Ag), aluminum (Al), copper (Cu), ruthenium (Ru), rhodium (Rh), iridium (Ir), or alloys thereof.

18. A device comprising:
an energy source; and
a near field transducer (NFT), the NFT comprising a peg and a disc and the peg comprising peg material and at least one associated amorphous blocker layer, wherein the amorphous blocker layer comprises an amorphous metal alloy and the amorphous blocker layer is within the peg material, on one or more surfaces of the peg material, or both.

19. The device according to claim 18, wherein the energy source comprises a laser.

20. The device according to claim 18 further comprising a waveguide, the waveguide configured to receive the energy from the energy source and couple it into the NFT.

* * * * *